United States Patent
Ye et al.

(10) Patent No.: US 8,308,335 B2
(45) Date of Patent: Nov. 13, 2012

(54) LIGHT EMITTING MODULE

(75) Inventors: Zhi-Ting Ye, Miaoli County (TW);
Kuo-Jui Huang, Taichung County (TW)

(73) Assignee: Wintek Corporation, Taichung (TW)

( * ) Notice: Subject to any disclaimer, the term of this patent is extended or adjusted under 35 U.S.C. 154(b) by 143 days.

(21) Appl. No.: 12/917,482

(22) Filed: Nov. 2, 2010

(65) Prior Publication Data
US 2011/0103090 A1    May 5, 2011

(30) Foreign Application Priority Data
Nov. 3, 2009    (TW) ................................ 98137309 A

(51) Int. Cl.
*F21V 7/04*    (2006.01)
(52) U.S. Cl. ................... 362/607; 362/97.4; 362/615
(58) Field of Classification Search ............ 362/606, 362/607, 615–617, 619, 620, 97.1–97.4
See application file for complete search history.

(56) References Cited

U.S. PATENT DOCUMENTS

| | | | |
|---|---|---|---|
| 5,598,280 A * | 1/1997 | Nishio et al. | 349/57 |
| 6,091,547 A | 7/2000 | Gardiner et al. | |
| 2005/0219836 A1* | 10/2005 | Hung | 362/97 |
| 2007/0297168 A1* | 12/2007 | Chang et al. | 362/223 |
| 2008/0043172 A1* | 2/2008 | Kim et al. | 349/65 |

FOREIGN PATENT DOCUMENTS

| | | |
|---|---|---|
| CN | 1746704 | 3/2006 |
| CN | 201222148 | 4/2009 |

OTHER PUBLICATIONS

"First Office Action of China counterpart application" issued on Jan. 11, 2012, p. 1-p. 4.

\* cited by examiner

*Primary Examiner* — Danielle Allen
(74) *Attorney, Agent, or Firm* — Jianq Chyun IP Office

(57) ABSTRACT

A light emitting module comprising a light-guide plate, a light source, and a light modulating film is provided. The light-guide plate has a light emitting surface and a light receiving surface. The light source is located at a side corresponding to the light receiving surface. The light modulating film is disposed on the light emitting surface. The light modulating film has a plurality of protruding bars located at a side away from the light emitting surface wherein each protruding bar has a vertex angle from 120° to 178°.

10 Claims, 5 Drawing Sheets

LIGHT EMITTING MODULE

CROSS-REFERENCE TO RELATED APPLICATION

This application claims the priority benefit of Taiwan application serial no. 98137309, filed on Nov. 3, 2009. The entirety of the above-mentioned patent application is hereby incorporated by reference herein and made a part of this specification.

BACKGROUND OF THE INVENTION

1. Field of the Invention

The invention relates to a light emitting module, and more particularly to a light emitting module having high light-utilization efficiency.

2. Description of Related Art

FIG. 1A illustrates a schematic drawing according to a conventional backlight module. Referring to FIG. 1A, a backlight module 100 includes a light-guide plate 110, a light source 120, a diffuser 130, a bottom brightness enhancement film 140, and an upper brightness enhancement film 150. The light-guide plate 110 has a light receiving surface 112 and a light emitting surface 114. The light source 120 is located at a side of the light-guide plate 110 corresponding to the light receiving surface 112, and the diffuser 130 is located on the light emitting surface 114. In addition, the diffuser 130 is located between the bottom brightness enhancement film 140 and the light guide plate 110, and the bottom brightness enhancement film 140 is located between the upper brightness enhancement film 140 and the diffuser 130. The backlight module 100 is a side type design, and thus the light receiving surface 112 and the light emitting surface 114 are disposed adjacent to each other. Nevertheless, when the backlight module 100 is a direct type design, the light receiving surface 112 and the light emitting surface 114 are disposed opposite to each other.

Generally, the dispositions of the bottom brightness enhancement film 140 and the upper brightness enhancement film 150 are apt to render the emitted light concentrate to the regular view direction N, e.g. the normal direction of the light emitting surface 114 to provide satisfactory light emitting effect. The bottom brightness enhancement film 140 and the upper brightness enhancement film 150 are the optical films having prism structures, and the vertex angles of the prism structures are generally 90° to provide the desirable light emitting effect at the regular view direction N.

FIG. 1B schematically illustrates the optical effect of the conventional prism structures. Referring to FIG. 1B, the prism structure 160 is the surface structure design of the above-mentioned bottom brightness enhancement film 140 or the upper brightness enhancement film 150. In a normal circumstance, the light L1 is efficiently concentrated to the regular view direction N by passing the prism structure 160 to improve the light emitting effect at the regular view direction N. However, when the included angle θ between the light L1 and the regular view direction N is 0° to 10°, the light L1 is total inner reflected by the optical effect provided by the prism structure 160. Accordingly, the light L1 is unable to be emitted outward and be used such that the light utilization efficiency of the backlight module 100 is restricted.

SUMMARY OF THE INVENTION

The invention is directed to a light emitting module capable of efficiently reducing the total inner reflection of the light of the light emitting module.

The invention provides a light emitting module comprising a light-guide plate, a light source, and a light modulating film. The light-guide plate has a light emitting surface and a light receiving surface. The light source is located at a side of the light receiving surface. The light modulating film is disposed on the light emitting surface. The light modulating film has a plurality of protruding bars at a side away from the light emitting surface, and the vertex angles of the protruding bars away from the light emitting surface is from 120° to 178°.

In an embodiment of the invention, the vertex angles are 120° to 155°.

In an embodiment of the invention, the light emitting module further includes a diffuser located between the light-guide plate and the light modulating film.

In an embodiment of the invention, the light emitting module further includes a first brightness enhancement film, and the light modulating film is located between the first brightness enhancement film and the light-guide plate. The first brightness enhancement film has a plurality of first prism structures, and the vertex angles of the first prism structures are substantially 90°, for example. Furthermore, the light emitting module further has a second light brightness enhancement film, and the first brightness enhancement film is located between the second brightness film and the light modulating film. In an embodiment, the second brightness enhancement film has a plurality of second prism structures, and the vertex angles of the second prism structures are substantially 90°.

In an embodiment of the invention, the light emitting surface and the light receiving surface are disposed opposite to each other.

In an embodiment of the invention, the light emitting surface and the light receiving surface are disposed adjacent to each other.

In an embodiment of the invention, a pitch of two adjacent protruding bars is a fixed value.

In an embodiment of the invention, a pitch of two adjacent protruding bars is not a fixed value.

In an embodiment of the invention, the protruding bars are extended windingly along a direction.

In an embodiment of the invention, the light modulating film has a plurality of diffuser structures.

In an embodiment of the invention, the light source includes at least a light emitting diode or at least a cold cathode fluorescence tube.

In an embodiment of the invention, each vertex of the protruding bars is a rounded corner.

In view of the above, the light emitting module of the invention is configured with a light modulating film having protruding bars with obtuse vertex angles. Accordingly, the light of the light emitting module is not easily total inner reflected and apt to improve the light utilization efficiency of the light emitting module.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
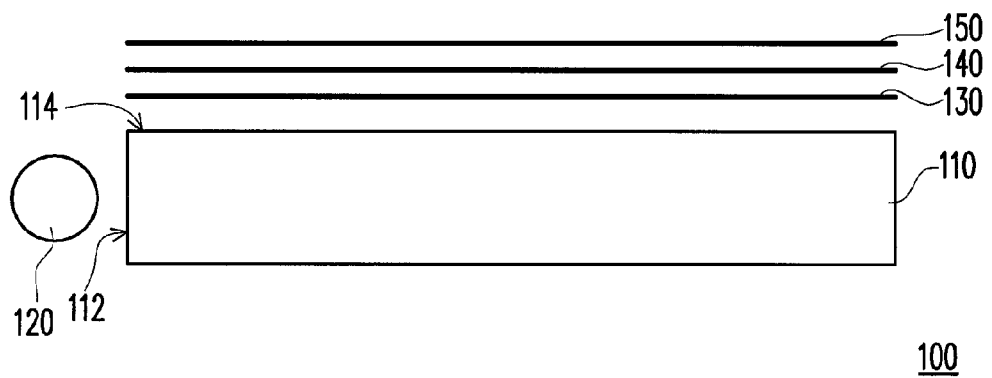
FIG. 1A illustrates a schematic drawing according to a conventional backlight module.
Figure 1B:
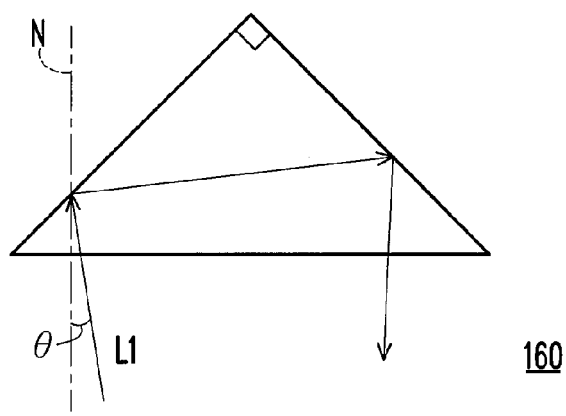
FIG. 1B schematically illustrates the optical effect of the conventional prism structures.
Figure 2A:
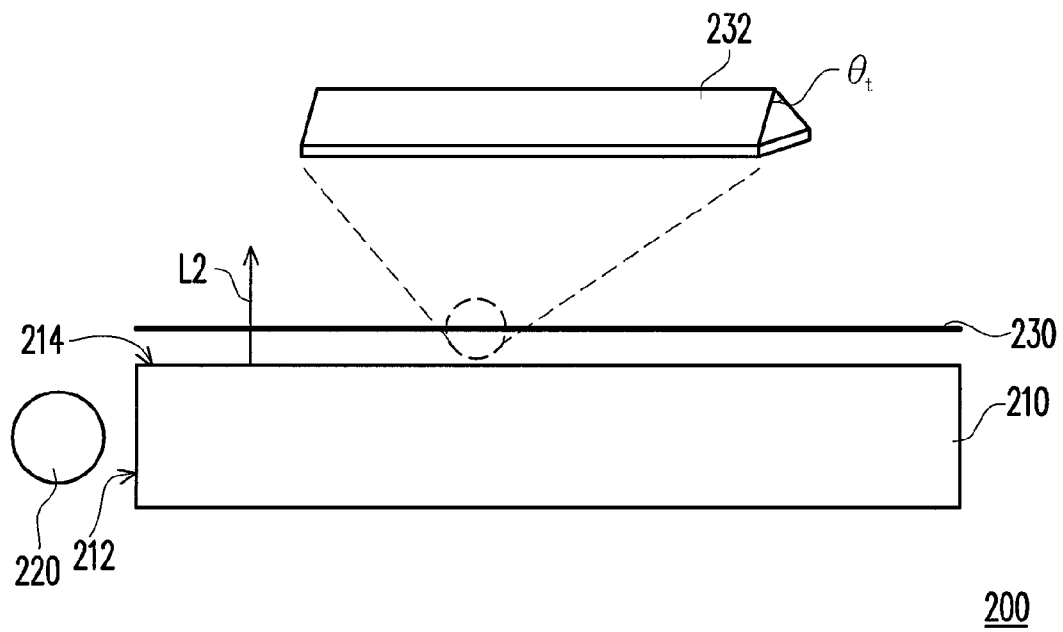
FIG. 2A illustrates a light emitting module according to an embodiment of the invention.

FIG. 2A illustrates a light emitting module according to an embodiment of the invention. Referring to FIG. 2A, a light emitting module 200 includes a light-guide plate 210, a light source 220, and a light modulating film 230. The light-guide plate 210 has a light receiving surface 212 and a light emitting surface 214. The light source 220 is located at a side of the light-guide plate 210 corresponding to the light receiving surface 212. The light modulating film 230 is disposed on the light emitting surface 214. The light modulating film 230 has a plurality of protruding bars 232 at a side away from the light emitting surface 214. In the present embodiment, the light receiving surface 212 and the light emitting surface 214 are disposed adjacent to each other to form a side type design of the light emitting module 200.

In other embodiments, the light receiving surface 212 and the light emitting surface 214 are disposed opposite to each other to form a direct type design of the light emitting module 200. In addition, the light source 220 includes at least a light emitting diode or at least a cold cathode fluorescence lamp. Namely, the light source 220 can be formed by a linear light source, a point light source, or a combination thereof.

Figure 2B:
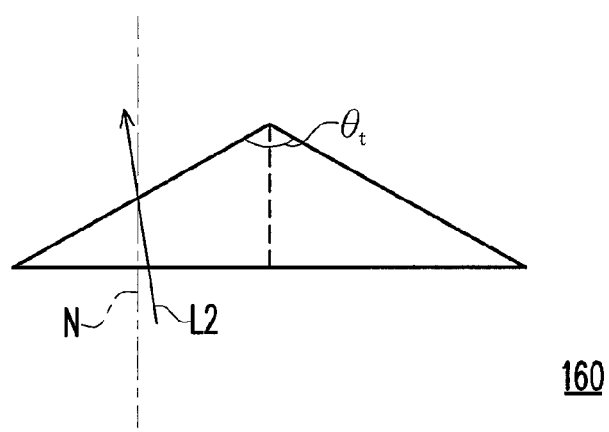
FIG. 2B is a schematic cross sectional view of the protruding bar according to the light modulating film of FIG. 2A.

FIG. 2B is a schematic cross sectional view of the protruding bar according to the light modulating film of FIG. 2A. Referring to FIGS. 2A and 2B simultaneously, the light L2 emitted from the light source 220 and passing through the light-guide plate 210 is emitted from the light emitting surface 214, wherein the vertex angle θt of the protruding bars 232 is from 120° to 178°. Accordingly, the light L2 is not total inner reflected when the included angle included between the light L2 and the regular view direction N, i.e. the normal direction of the light emitting surface 214, is about 0° to 10°. In other words, the present embodiment is conducive to efficiently use the light L2 emitted from the light source 220. In one embodiment, the vertex angle θt can be from 120° to 155°. Under the design of a obtuse vertex angle θt, the light L2 is not easily total inner reflected by the light modulating film 230 to improve the light utilization efficiency.

Figure 2C:
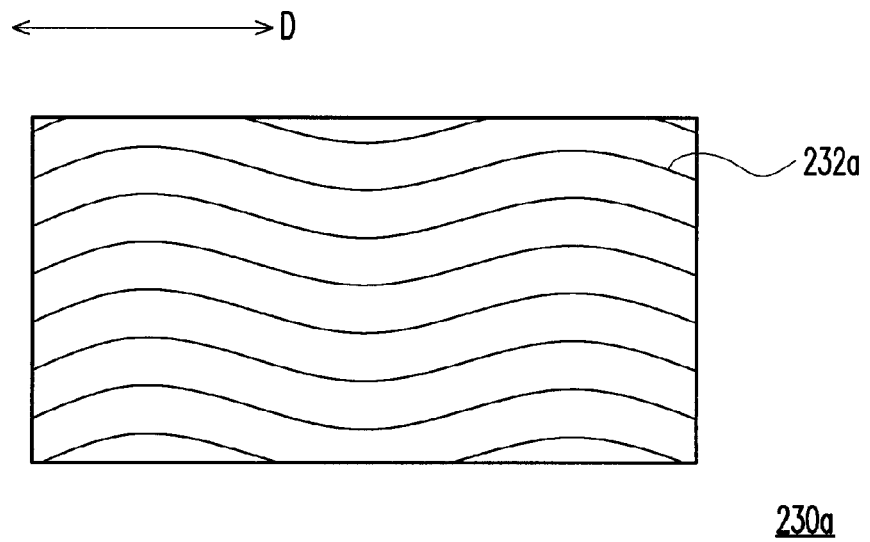
FIG. 2C illustrates a schematic top view of the light modulating film according to another embodiment of the invention.
Figure 2D:
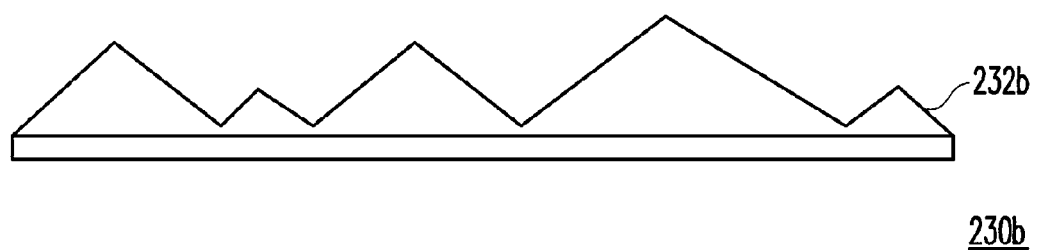
FIG. 2D illustrates a schematic cross-sectional view of the light modulating film according to another embodiment of the invention.
Figure 2E:
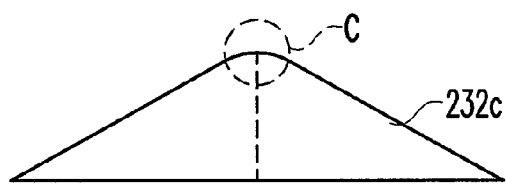
FIG. 2E illustrates a schematic cross-sectional view of the protruding bar of the light modulating film according to another embodiment of the invention.

The protruding bars 232 in the present embodiment are, but not limited to, straight protruding bars 232. FIG. 2C illustrates a schematic top view of the light modulating film according to another embodiment of the invention. Referring to FIG. 2C, the protruding bars 232a are not definitely straight, but windingly extended along a direction D in the light modulating film 230a. In addition, FIG. 2D illustrates a schematic cross-sectional view of the light modulating film 230b according to another embodiment of the invention. Referring to FIG. 2D, a pitch of two adjacent protruding bars 232b in the light modulating film 230b is not a fixed value. Specifically, the heights of the two adjacent protruding bars 232b are different. Nevertheless, the pitch of the two adjacent protruding bars 232b can be a fixed value, that is, all protruding bars 232b may have the same size and the same design. FIG. 2E illustrates a schematic cross-sectional view of the protruding bar of the light modulating film according to another embodiment of the invention. Referring to FIG. 2E, the vertex of the protruding bar 232c can be a rounded corner C. In other words, as long as the protruding bars 232, 232a, 232b, and 232c have obtuse vertex, the design complies with the spirit of the invention. The extending posture, the height, the size, the sharp vertex, or the rounded vertex of the protruding bar is not limited in the above embodiments.

In a word, referring to FIGS. 2A and 2B, the present embodiment is conducive to improve the light utilization efficiency of the light emitting module 200 and prevent the ineffectual consumption of power. In addition, the protruding bars 230 is helpful to appropriately concentrate the light L2 to the regular view direction N to provide desirable light emitting effect. More specifically, the light modulating films 230, 230a, and 230b can additionally have a plurality of diffuser structures to improve the light emitting evenness of the light emitting module 200. However, the invention is not restricted herein, and the light emitting module 200 in other embodiments can further have other optical films to further improve the light emitting effect.

Figure 3:
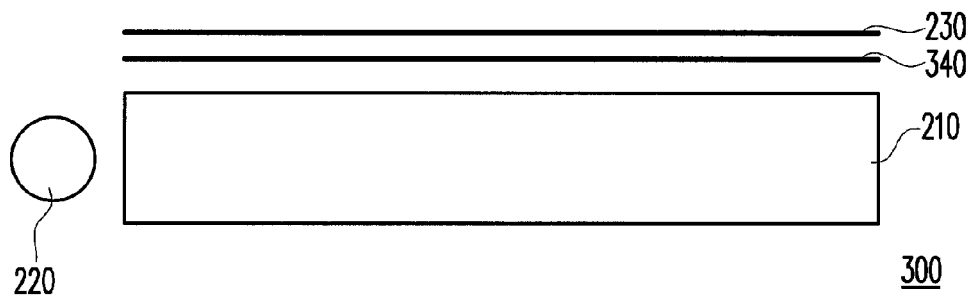
FIG. 3 illustrates a light emitting module according to another embodiment of the invention.

For example, FIG. 3 illustrates a light emitting module according to another embodiment of the invention. Referring to FIG. 3, in addition to the elements of the light emitting module 200, the light emitting module 300 further has a diffuser 340 located between the light-guide plate 210 and the light modulating film 230 to enhance the emitting evenness of the light emitting module 300. Alternatively, the light modulating film 230 can be the light modulating film 230a or the light modulating film 230b mentioned above, and can have the protruding bar 232c configuring with the rounded vertex illustrated in FIG. 2E. Accordingly, the light emitted from the light source 220 is not total inner reflected easily such that the light emitting module 300 has desirable light utilization efficiency.

Figure 4:
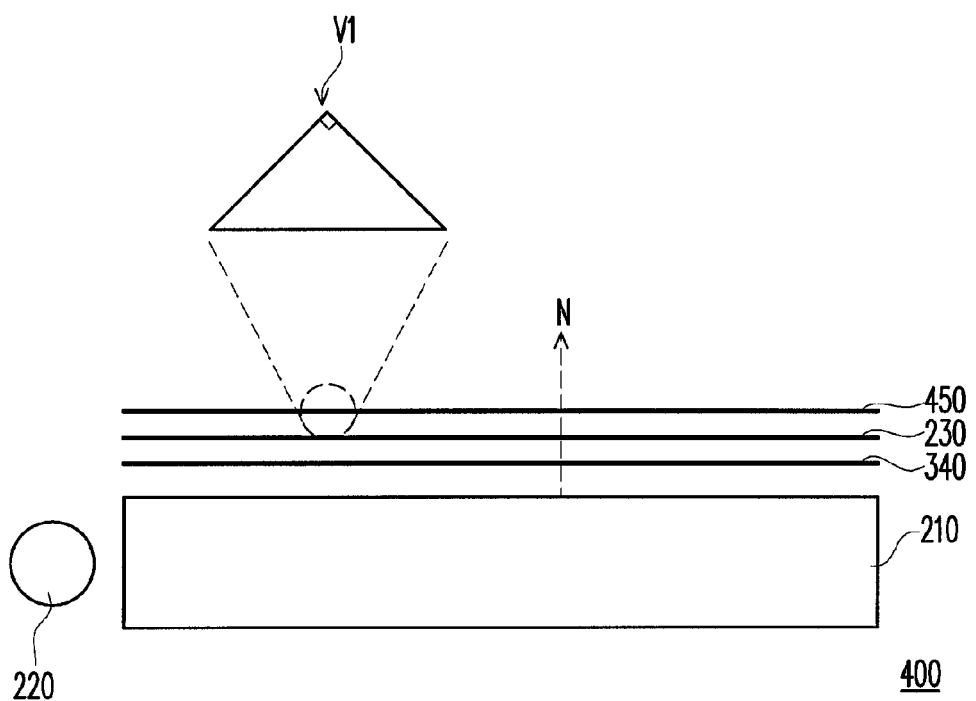
FIG. 4 illustrates a light emitting module according to another embodiment of the invention.

FIG. 4 illustrates a light emitting module according to another embodiment of the invention. Referring to FIG. 4, in addition to the elements of the light emitting module 300, the light emitting module 400 further has a first brightness enhancement film 450, and the light modulating film 230 is located between the first brightness enhancement film 450 and the diffuser 340. The first brightness enhancement film 450 has a plurality of first prism structures V1, and the vertex angles of the first prism structures V1 are substantially 90°. The design of the first prism structure V1 facilitates the emitting brightness of the light emitting module 400 at the regular view direction N. Particularly, the extending direction of the first prism structures V1 can be parallel or cross to the extending direction of the protruding bars of the light modulating film 230.

Usually, the light entering the first brightness enhancement film 450 and including with the regular view direction N by 0° to 10° is total inner reflected by the optical effect of the first brightness enhancement film 450. Similar to the aforesaid description of the related art, the light can not be used. However, in the light emitting module 400 of the present embodiment, the transmissive path of the light is modulated by the light modulating film 230 and then the light enters the first brightness enhancement film 450 such that the original transmissive path of the light included with the regular view direction N by 0° to 10° is modulated, and the light enters the first brightness enhancement film 450 in a different incident angle. Accordingly, the possibility of the total inner reflection of the light in the first brightness enhancement film 450 is reduced in the present embodiment and facilitates light utilization efficiency.

Figure 5:
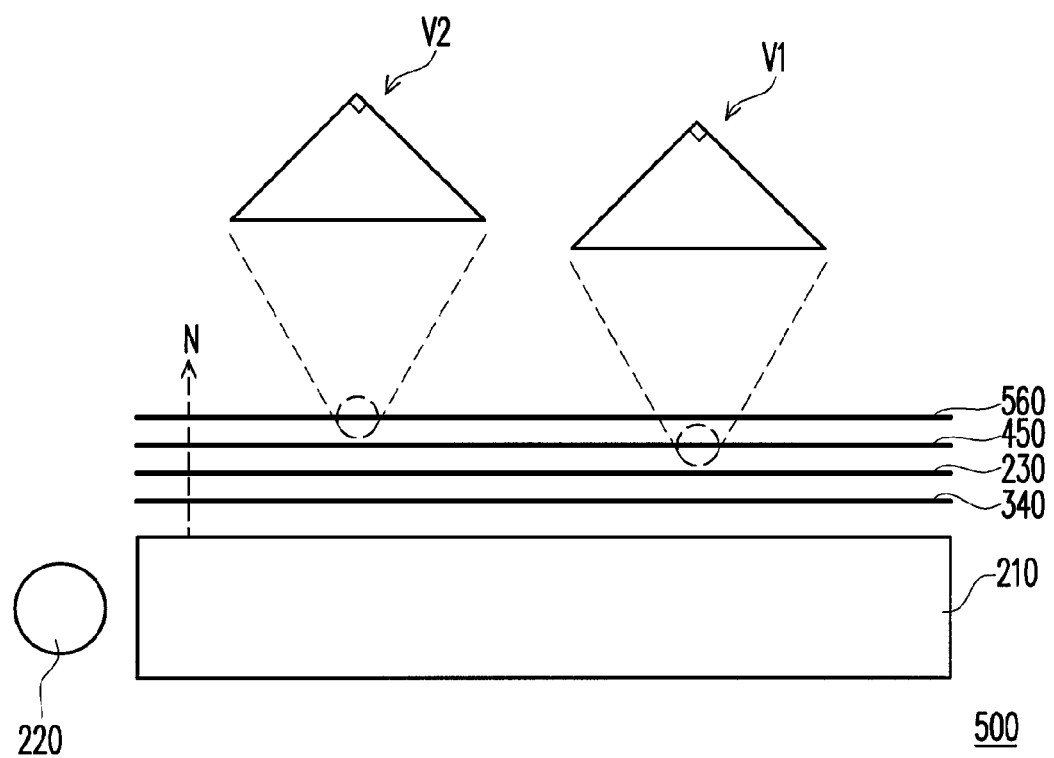
FIG. 5 illustrates a light emitting module according to another embodiment of the invention.

Furthermore, FIG. 5 illustrates a light emitting module according to another embodiment of the invention. Referring to FIG. 5, the light emitting module 500 has the elements of the light emitting module 400 and further has a second brightness enhancement film 560. The first brightness enhancement film 450 is located between the second brightness enhancement film 560 and the light modulating film 230. In addition, the second brightness enhancement film 560 has a plurality of second prism structures V2, and the vertex angles of the second prism structures V2 are substantially 90°. It is noted that the extending direction of the first prism structures V1 can be perpendicular to the extending direction of the second prism direction V2. Accordingly, the light emitting module 500 has better light emitting effect at the regular view direction N.

Similarly, the present embodiment improves the light utilization of the light emitting module 500. Base on a real measurement, the brightness of the light emitting module 500 with the light modulating film 230 is 1.1 times to the brightness of the conventional light emitting module 100 without the light modulating film 230. Namely, the brightness of the light emitting module 100 can be efficiently enhanced by adding the light modulating film 230.

On the other hand, when the extending direction of the first prism structures V1 is perpendicular to the extending direction of the second prism structures V2 and the light enters the first brightness enhancement film 450 in the transmissive direction included with the regular view direction N by about 45° to 50°, a preferable emitting effect at the regular view direction N is obtained. In a real circumstance, a part of the light emitted from the light-guide plate 210 may enter the first brightness enhancement film 450 in an oblique angle such that the brightness enhancement films 450 and 560 can not provide the preferable optical effect. Nevertheless, the light modulating film 230 of the present embodiment is provided to modulate the divergent transmissive direction of the oblique light to a required transmissive direction. Therefore, the light modulating film 230 is apt to improve the effects provided by the brightness enhancement films 450 and 560. According to the simulation of the light emitting angle, when the elements other than the light modulating film 230 are set in the same size, the half intensity directional angle of the light emitting module 500 is reduced from 22° to 20° by disposing the light modulating film 230. That is to say, the light emitting module 500 can have superior light emitting effect at the regular view direction N.

It is noted that the light emitting modules 300, 400, and 500 illustrated in FIGS. 3 to 5 can be modified to be a direct type design. That is to say, the light emitting surface and the light receiving surface of the light-guide plate 210 can be disposed opposite to each other. In addition, the light emitting modules 200, 300, 400, and 500 can be applied to a back light source of a display device or to an illuminating apparatus.

In summary, the light emitting module of the invention has the light modulating film to modulate the transmissive direction of the light to further reduce the probability of the total inner reflection in the brightness enhancement film. Namely, majority of the light emitted from the light emitting module is used to provide desirable light utilization efficiency and good light emitting effect at the regular view direction.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A light emitting module, comprising:
   a light-guide plate having a light emitting surface and a light receiving surface;
   a light source located at a side corresponding to the light receiving surface;
   a light modulating film disposed on the light emitting surface and comprising a plurality of protruding bars located at a side away from the light emitting surface wherein each protruding bar comprises a vertex angle from 120° to 178°;
   a diffuser disposed between the light guide plate and the light modulating film;
   a first brightness enhancement film disposed on the light modulating film, wherein the first brightness enhancement film has a plurality of first prism structures with vertex angles in 90°; and
   a second brightness enhancement film disposed on the first brightness enhancement film, wherein the second brightness enhancement film has a plurality of second prism structures with vertex angles in 90°.

2. The light emitting module as claimed in claim 1, wherein the vertex angle is from 120° to 155°.

3. The light emitting module as claimed in claim 1, wherein the light emitting surface is disposed opposite to the light receiving surface.

4. The light emitting module as claimed in claim 1, wherein the light emitting surface is disposed adjacent to the light receiving surface.

5. The light emitting module as claimed in claim 1, wherein a pitch of two adjacent protruding bars is a fixed value.

6. The light emitting module as claimed in claim 1, wherein pitches of any two adjacent protruding bars are not in a fixed value.

7. The light emitting module as claimed in claim 1, wherein the protruding bars are windingly extended.

8. The light emitting module as claimed in claim 1, wherein the light modulating film further has a plurality of diffuser structures.

9. The light emitting module as claimed in claim 1, wherein the light source comprises a light emitting diode or a cold cathode fluorescence tube.

10. The light emitting module as claimed in claim 1, wherein each vertex of the protruding bars is a rounded corner.

* * * * *